3,215,936
CURRENT DRIFT MEASURING APPARATUS INCLUDING TIMER CONTROL OF COMPARISON AND INDICATING MEANS
John W. McGrath, Allentown, Pa., assignor to Western Electric Company, Incorporated, a corporation of New York
Filed Mar. 17, 1961, Ser. No. 96,462
2 Claims. (Cl. 324—158)

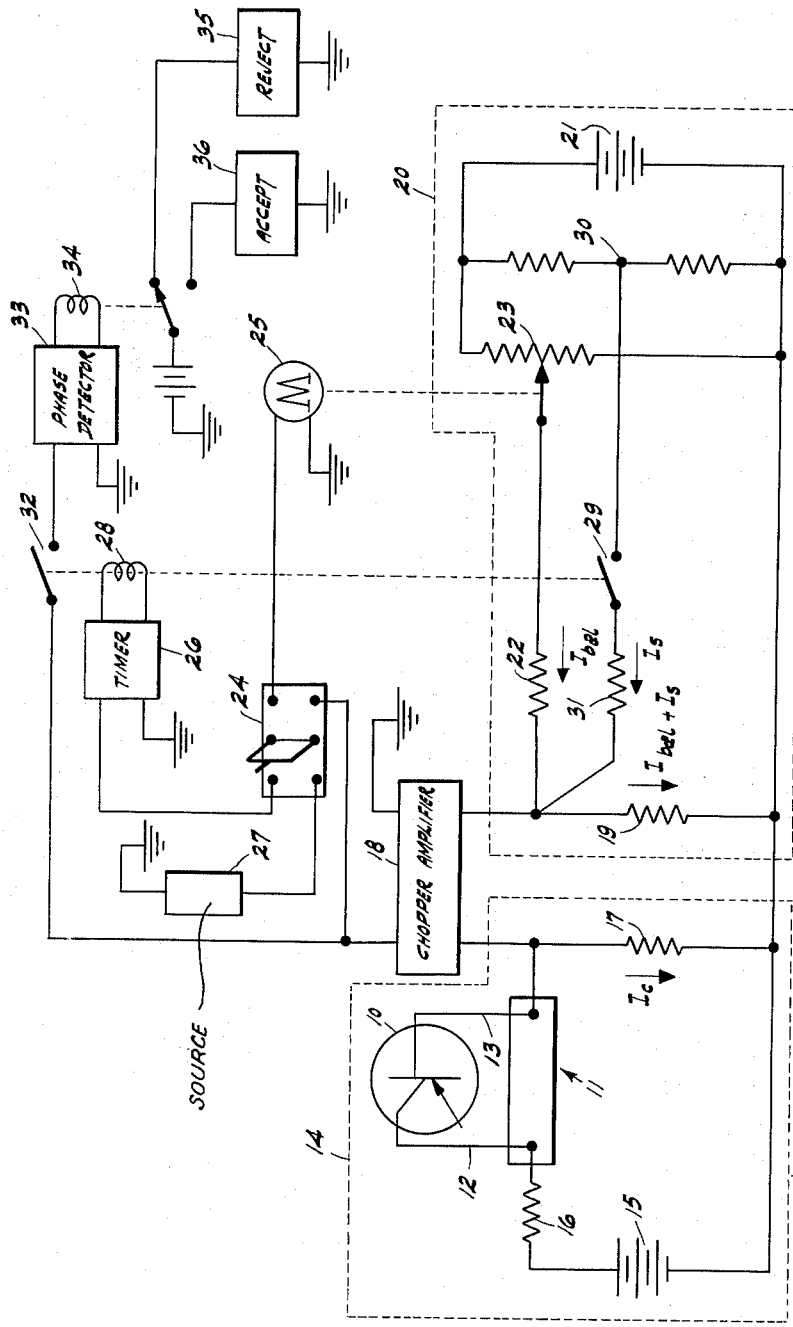

This invention relates to apparatus for determining the magnitude of drift of a direct current and particularly for determining the magnitude of drift of a transistor collector current after an initial operating period.

In the manufacture of electrical components, a number of tests are required in order to determine the operational characteristics of the components; for example, in the manufacture of transistors, it is important to ascertain whether or not the saturation collector current drift during an initial operating period exceeds a maximum allowable increase. One method of performing this test is to connect the collector lead and the base lead of the transistor in a direct current meter circuit having a source of known potential difference and, after a sufficient drift period, observe whether or not the current through the meter has increased by an amount in excess of a predetermined maximum value. This is a slow and expensive procedure which requires the operator's close attention to minute meter readings in determining acceptance or rejection of the tested transistor.

The object of this invention is an improved apparatus for rapid testing of transistor collector current drift.

According to the general features of the invention, the difference between a direct current to be measured and a balancing direct current is applied to the input of a converter. The converter's alternating current output is used to operate means for varying the balancing current to reduce the difference to zero. After a fixed time interval, the balancing current is increased by an amount equal to the permissible increase in the current to be measured and the corresponding converter output is used to operate "accept" or "reject" circuits.

In a preferred embodiment of the invention, the collector lead and the base lead of a transistor under test are connected to a direct current source. A potential proportional to the current in the test circuit is applied to the input of a chopper amplifier in opposition to a potential proportional to a current in a balancing circuit. A potential unbalance at the amplifier input produces an alternating current output which energizes a servo motor to adjust a variable resistance element in the balancing circuit and reduce the potential unbalance to zero. The servo motor is then disconnected and, after a predetermined period of time, a current of known value, corresponding to the maximum allowable increase in the test current, is added to the balancing circuit and a phase detector is connected to the output of the amplifier. If the test current has increased by more than the allowable value added to the balancing circuit, a "reject" circuit in the output of the phase detector is energized.

The invention will be more fully understood from the following detailed description and by reference to the accompanying drawing, which is a schematic diagram of an apparatus constructed and arranged according to a preferred embodiment of the invention.

In general, the operation of the apparatus is such that a polarized relay 34 is operated to close one external load circuit 35 or another 36 according to whether a direct current $I_c$ in a test circuit 14 increases during a warm-up period to a value above or below a prescribed allowable maximum value, $I_{bal}$ plus $I_s$, in a voltage balancing circuit 20. The test circuit 14 may be a transistor saturation collector current test circuit in an automatic test set and the external load circuits 35 ad 36 may be energized circuits for apparatus indicating acceptance or rejection of the tested transistor.

A transistor 10 to be tested in inserted into a testing apparatus socket 11 in such manner that collector lead 12 and base lead 13 are connected in and close test circuit 14 which also includes direct current source 15 of the appropriate polarity, current limiting resistor 16 and sampling resistor 17 across which a potential proportional to test current $I_c$, the collector current of transistor 10, is derived and applied to the input of a conventional type chopper amplifier 18.

The balancing circuit 20 includes a direct current source 21, which may be derived from the same source as direct current source 15, a current-limiting resistor 22, a variable resistance element 23 which may conveniently be a potentiometer, and a sampling resistor 19, which is identical to a sampling resistor 17. A potential proportional to balancing current $I_{bal}$ is derived across sampling resistor 19 and applied to the input of amplifier 18 in opposition to the potential of test circuit 14. While explained in terms of identical sampling resistors, obviously with different currents, resistors of different values could be used, as long as the respective voltage drops are equal.

Upon selective operation of a switching key 24 a servomotor 25 is connected to the output of the amplifier 18. Servo-motor 25 responds in accordance with a difference of potentials at the input of amplifier 18 to adjust variable resistance element 23 of balancing circuit 20 until the balancing current $I_{bal}$ is equal to the test current $I_c$, at which time there is a balance of potentials at the input of amplifier 18.

Switching key 24 is then selectively operated to disconnect servo-motor 25 from the output of amplifier 18 and to connect timing means 26 to energizing source 27. Timing means 26 may conveniently be a conventional interval timer which has been pre-set to energize relay 28 at the expiration of a predetermined drift time interval. Energization of relay 28 closes its normally open contacts 29 and 32. Closure of contact 29 completes a path for direct current $I_s$, of predetermined value, from voltage divider 30 through current-limiting resistor 31 and sampling resistor 19. The circuit constants are such that this added current $I_s$ is equal to the maximum allowable increase of test current $I_c$ during the predetermined drift time internal.

Closure of contact 32 connects a phase detector 33, of a type well known in the art, and a polarized relay 34 to the output of chopper amplifier 18. If test current $I_c$ has increased during the drift time interval to a value exceeding that of the sum of balancing current $I_{bal}$ and added current $I_s$, the potential difference at the input of amplifier 18 will produce a direct current amplifier input of one polarity resulting in an alternating current amplifier output of one phase such that phase detector 33 will energize polarized relay 34 to close external load circuit 35, which may conveniently operate a lamp or other type of indicating device, to indicate that the transistor 10 under test is a reject.

If test current $I_c$ has not increased during the drift time interval to a value exceeding that of the sum of balancing current $I_{bal}$ and added current $I_s$, the potential difference at the amplifier input will produce a direct current input of the opposite polarity resulting in an alternating current amplifier output of the opposite phase such that phase detector 33 will energize polarized relay 34 to close external load circuit 36 to indicate "accept" of the transistor 10 under test.

While the invention is described in connection with the testing of magnitude of transistor collector current, it is to be understood that the above described arrangements are simply illustrative of an application of the principles of the invention. Numerous other arrangements and applications may be readily devised by those skilled in the art which will embody the principles of the invention and fall within the spirit and scope thereof.

What is claimed is:

1. In an electrical testing apparatus for determining variation in current flow through a semiconductor device over a predetermined time,
    a first circuit including a source of electrical current, said semiconductor device and a first sampling resistor across which is developed a potential that varies in accordance with the current flow through said semiconductor device,
    a second circuit including a source of electrical current, and a second sampling resistor across which is developed a potential that varies in accordance with the current flow in said second circuit,
    an adjustable resistor connected in said second circuit,
    means responsive to difference in said developed potentials for varying said adjustable resistor until said potentials are the same,
    a normally deenergized timer device,
    means for interrupting said adjustable resistor varying means and for energizing said timer device,
    means responsive to said timer device for increasing the current flow through said second sampling resistor by a predetermined amount, and
    means responsive to said timer device or detecting the magnitude of difference between the potentials developed across said sampling resistors.

2. In an electrical apparatus for determining the magnitude of drift of a transistor collector current,
    a first comparison circuit including a source of electrical current for impressing current through a collector and base of a transistor,
    a first sampling resistor included in said first circuit across which is developed a potential which is proportional to the collector-base current,
    a second comparison circuit including a source of electrical current and a second sampling resistor across which a test potential is developed,
    an adjustable resistor connected in said second comparison circuit or regulating the potential developed across said second sampling resistor,
    a chopper amplifier connected to respond to the phase relationship in the potentials developed across both said sampling resistors for producing an output of a first phase when said potentials differ in a first direction, and an output of a second phase when said potentials differ in a second direction,
    means responsive to the output of said chopper amplifier for varying said adjustable resistor until the potentials across said sampling resistors are the same,
    a test resistor means having a normally open first contact connected in said second comparison circuit for applying a predetermined added current through said second sampling resistor,
    a phase detector means having a normally open second contact for ascertaining the phase of the output of said chopper amplifier,
    a normally deenergized timer device for closing, after a predetermined time delay, said contacts, and
    means for disconnecting said adjustable resistor varying means and for then energizing said timer device to close said contacts after said predetermined time delay to apply said added predetermined current to said second sampling resistor and to apply the output of said chopper amplifier to operate said phase detector means in accordance with the phase relationship of the potentials developed across said first and second sampling resistors.

References Cited by the Examiner

UNITED STATES PATENTS

| 2,512,702 | 6/50 | White | 324—99 |
| 2,664,543 | 12/53 | Thayer | 324—101 X |
| 2,889,518 | 6/59 | Hudson et al. | 324—62 X |
| 2,958,823 | 11/60 | Rabier | 324—98 X |

OTHER REFERENCES

Publication: Diode Drift Tester, Brammer and Zucco, I.B.M. Technical Disclosure Bulletin, vol. 2, No. 6, April 1960, p. 66.

WALTER L. CARLSON, *Primary Examiner.*

LLOYD McCOLLUM, *Examiner.*

UNITED STATES PATENT OFFICE
CERTIFICATE OF CORRECTION

Patent No. 3,215,936                        November 2, 1965

John W. McGrath

It is hereby certified that error appears in the above numbered patent requiring correction and that the said Letters Patent should read as corrected below.

Column 2, line 2, for "ad" read -- and --; line 3, for "energized" read -- energizing --; line 5, for "in" read -- is --; column 3, line 31 and column 4, line 1, for "or", each occurrence, read -- for --.

Signed and sealed this 19th day of July 1966.

(SEAL)
Attest:

ERNEST W. SWIDER                            EDWARD J. BRENNER
Attesting Officer                               Commissioner of Patents